(12) United States Patent
Chang

(10) Patent No.: US 6,439,352 B1
(45) Date of Patent: Aug. 27, 2002

(54) THRUST STRUCTURE OF BRAKE MECHANISM

(76) Inventor: Chin Ch'eng Chang, PO Box 82-144, Taipei (TW)

( * ) Notice: Subject to any disclaimer, the term of this patent is extended or adjusted under 35 U.S.C. 154(b) by 0 days.

(21) Appl. No.: 09/750,359

(22) Filed: Dec. 29, 2000

(51) Int. Cl.[7] .............................................. F16D 55/16
(52) U.S. Cl. ..................................... 188/72.7; 188/72.1
(58) Field of Search ............................... 188/72.7, 72.8, 188/72.4, 72.1, 71.1, 71.3, 71.4

(56) References Cited

U.S. PATENT DOCUMENTS

| | | | | |
|---|---|---|---|---|
| 4,029,179 A | * | 6/1977 | Butz | 188/72.7 |
| 4,295,548 A | * | 10/1981 | Quiney | 188/72.7 |
| 5,788,022 A | * | 8/1998 | Antony | 188/72.7 |
| 5,788,024 A | * | 8/1998 | Meyer | 188/72.7 |
| 6,250,438 B1 | * | 6/2001 | Chern | 188/72.7 |
| 6,264,011 B1 | * | 7/2001 | Zernickel | 188/72.1 |

* cited by examiner

*Primary Examiner*—Douglas C. Butler
(74) *Attorney, Agent, or Firm*—Leong C. Lei

(57) ABSTRACT

A thrust structure of brake mechanism with enhanced thrust and laborsaving operation, involving mainly outer casing in which is a turning block that is driven by a swing member, the turning block can drive a push block to move, the push block pressing against a moving member with a brake block. This invention is characterized in that, on opposite sides of the turning block and the push block is the formation of several matching cone-shaped elongated grooves, between the cone-shaped elongated grooves is a cone-shaped roller post, and on the bottom of the cone-shaped elongated groove is an incline that ascends gradually toward the direction of brake rotation, so designed that when the turning block is turning, the roller post rolling on the incline of the cone-shaped elongated groove will push the push block to move and perform braking operation, to enhance the brake thrust, reduce friction coefficient and upgrade braking efficiency.

2 Claims, 6 Drawing Sheets

THRUST STRUCTURE OF BRAKE MECHANISM

BACKGROUND OF THE INVENTION

1. Field of the Invention

This invention is related to a thrust structure of brake mechanism.

2. Description of the Prior Art

There are a wide variety of brakes, including conventional swing-arm type brake pad, lining pad, etc. In recent years, disc brakes, electromagnetic brakes and other types of new brakes have been introduced to upgrade braking efficiency and enhance safety. Taking into consideration the different brake performances, scope of applications and costs, the disc brakes are widely applied to various vehicles. Therefore, their braking efficiency has become more and more important. The brake efficiency involves several aspects. One particularly important factor is the brake thrust, as shown in FIGS. 1 and 2, a conventional brake mechanism involves mainly a turning block 11 installed inside an outer casing 10, the turning block 11 is driven by a swing member 12, on the other side of the turning block 11 is a push block 13 for parallel movement only, the push block 13 can push a moving member 15 with a brake block 18, between the moving member 15 and the outer cover 17 of the outer casing 10 is a spring that serves to automatically reset the push block 13 to original position.

On opposite sides of the turning block 11 and the push block 13 are the formations of several elongated arched grooves 110 and semi-circular grooves 130, to accommodate a roller 14. The elongated arched groove 110 is shaped as a water drop tapering to the direction of brake rotation. When the user pulls the brake handle, as shown in FIGS. 2 and 3, the swing member 12 drives the turning block 11, the roller 14 moves to the area with a small diameter, pushing out the push block 13 in parallel direction, which in turn push the brake block 18 on the moving member 15 to perform braking operation. When the user releases the brake handle, the turning block 11 will be driven by the swing member 12 and reset to its original position, while the compressed spring 16 will synchronously reset the push block 13 and accomplish a braking operation.

The force pushing the brake pad 18 of the above conventional brake mechanism comes mainly from the turning block 11, the elongated arch groove 110 and semi-circular groove 130 of the push block, and the roller 14. But the starting point of the semi-circular groove 130 and the elongated arch groove 110 is located to envelop the entire roller 14 (shown in FIG. 2), which results in increased friction coefficient between the roller 14 and the turning block 11 and the push block 13. Therefore, it requires a larger force to push the roller 14. Meanwhile, since the diameter of the roller 14 is small, the maximum length of the entire thrust line is no more than the diameter of the roller 14. Such a design of smaller brake thrust will result in reduced braking efficiency.

Therefore, it is an object of the present invention to provide a thrust structure of brake mechanism which can obviate and mitigate the above-mentioned drawbacks.

SUMMARY OF THE INVENTION

This invention is related to a thrust structure of brake mechanism.

It is the primary object of the present invention to provide a thrust structure of brake mechanism with enhanced thrust and laborsaving operation, involving mainly an outer casing in which is a turning block that is driven by a swing member, the turning block can drive a push block to move, the push block pressing against a moving member with a brake block, characterized in that, on opposite sides of the turning block and the push block is the formation of several matching cone-shaped elongated grooves, between the cone-shaped elongated grooves is a cone-shaped roller post, and on the bottom of the cone-shaped elongated groove is an incline that ascends gradually toward the direction of brake rotation, so designed that when the turning block is turning, the roller post rolling on the incline of the cone-shaped elongated groove will push the push block to move and perform braking operation, to enhance the brake thrust, reduce friction coefficient and upgrade braking efficiency.

The foregoing object and summary provide only a brief introduction to the present invention. To fully appreciate these and other objects of the present invention as well as the invention itself, all of which will become apparent to those skilled in the art the following detailed description of the invention and the claims should be read in conjunction with the accompanying drawings. Throughout the specification and drawings identical reference numerals refer to identical or similar parts. Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF PREFERRED EMBODIMENTS

Figure 1:
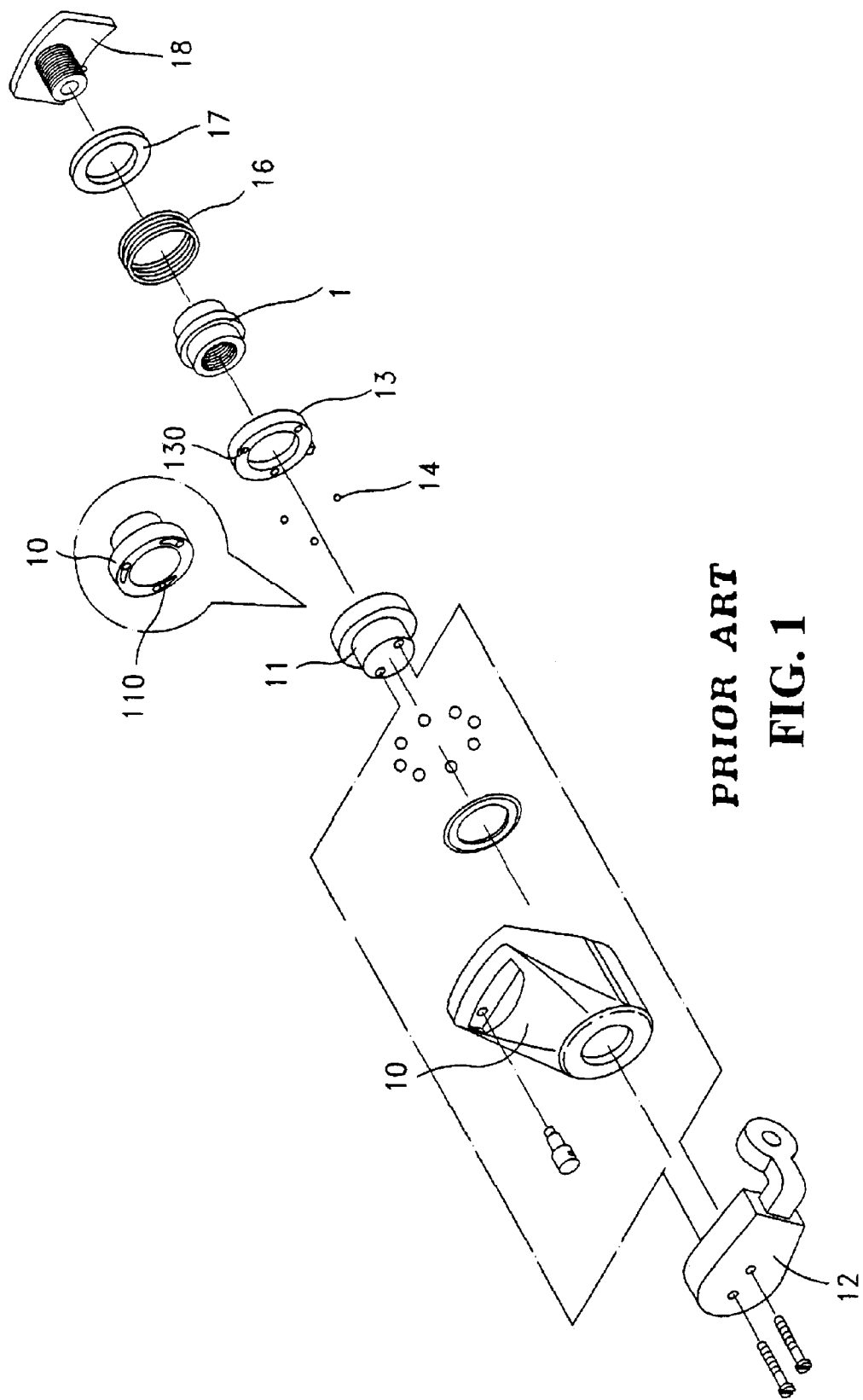
FIG. 1 is an exploded view of a prior art of brake mechanism.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 4:
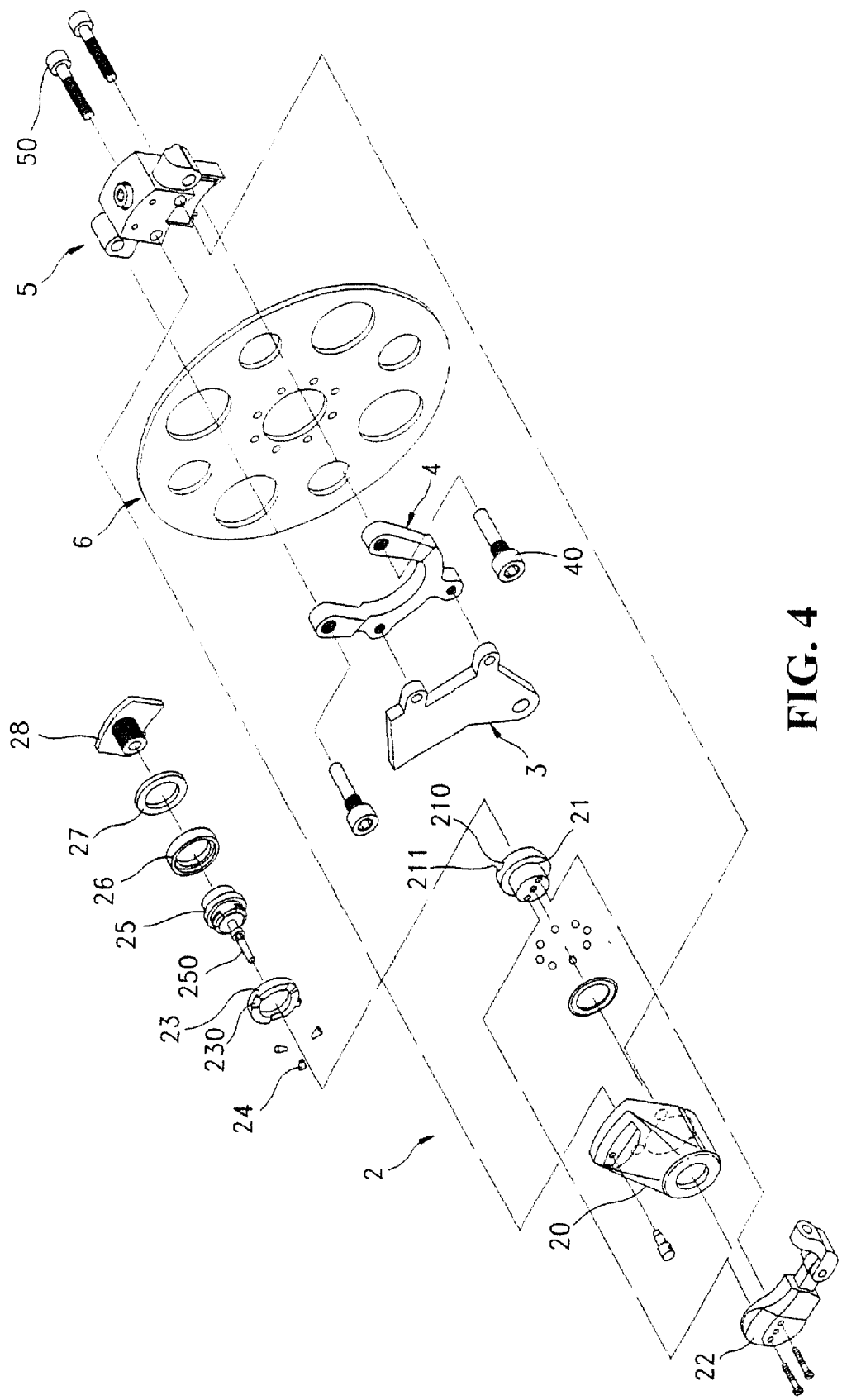
FIG. 4 is an exploded view of this invention of brake mechanism, showing the components of the invention and how they are related to each other.
Figure 5:
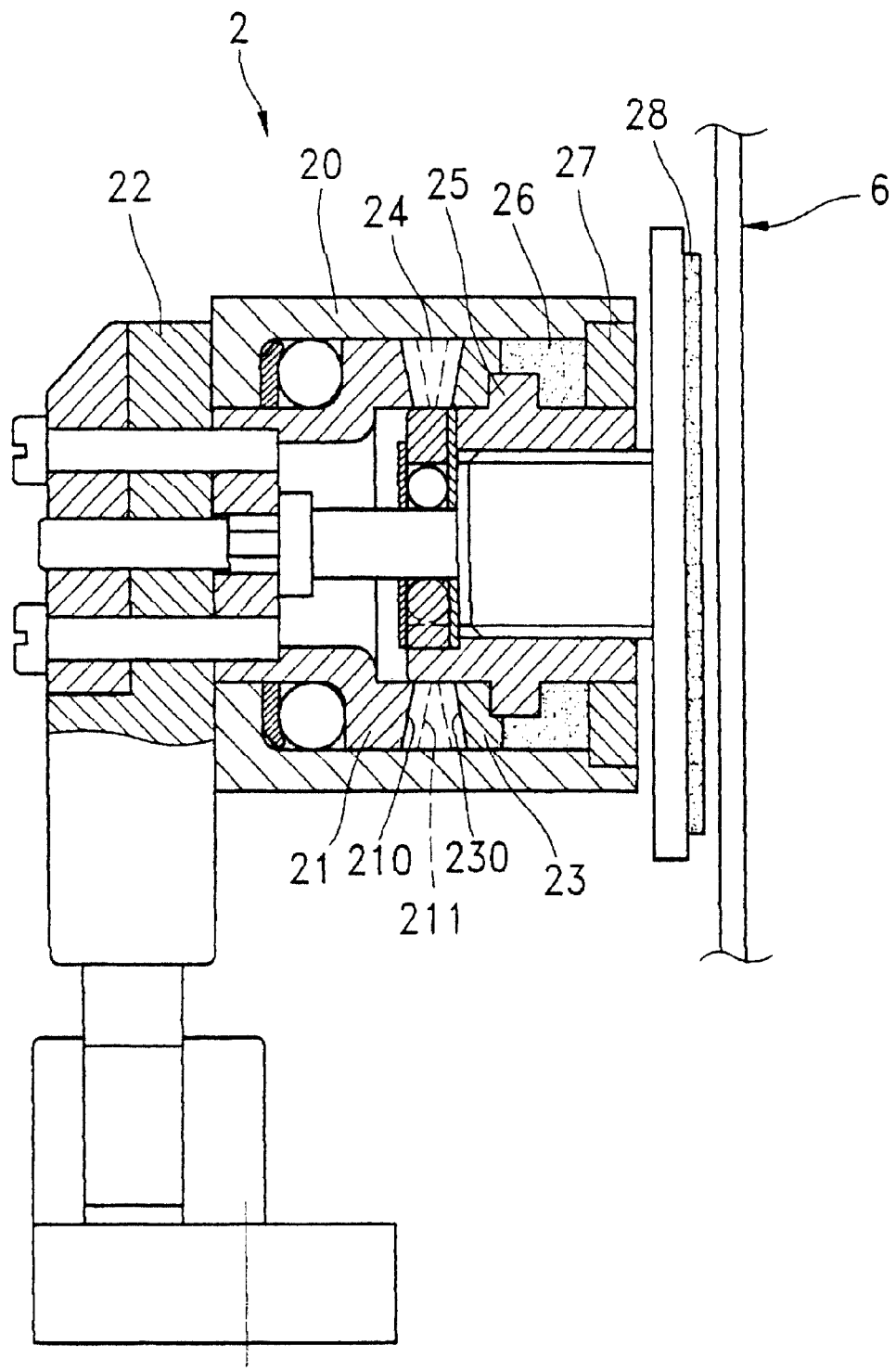
FIG. 5 is a schematic view of the invention, showing the inside configuration of the invention.

This invention relates to a push mechanism that improves the braking performance of the brake mechanism. As shown in FIG. 4, the brake involves mainly a locked member 4 that is locked on a fork 3 on one side of a brake disc 6. The locked member 4 involves a floating member 5 having a brake block, and is screwed to a bolt 50. The brake mechanism 2 and the floating member 5 are respectively located on two sides of the brake disc 6. When the user pulls the brake wire, the brake mechanism 2 and the brake block 28 of the floating member 5 will enable braking performance on the brake disc 6;

The detailed construction of the brake mechanism 2 is shown in FIGS. 4 and 5. The brake mechanism 2 involves mainly a turning block 21 that is fitted by a ball bowl set inside the outer casing 20. On the outside of the outer casing 20 is a swing member 22 to enable pulling the brake wire. The swing member is linked by a fixing pin to the turning block 21 to synchronously drive the turning block 21. Inside the outer casing 20 and on the other side of the turning block 21 is a push block 23. The push block 23 can be driven by the turning block 21 in parallel movement. On the other side of the push block 23 is arranged in sequence a moving member 25 with a guide lever 250 and a ring-shaped flexible member 26. The outer casing 20 involves a ring-shaped outer cover 27 to restrict the above components inside, and to lock the brake block 28 onto the moving member 25 after the brake block 28 is pulled through the outer cover 27 and the flexible member 26 (the flexible member can be made of rubber material to extend its service life), so the brake block 28 can be driven by the moving member 25 to move;

On the end surface of the turning block 21 opposite the push block 23 is the formation of several cone-shaped elongated grooves 210 to accommodate a cone-shaped roller post 24. On the bottom of each cone-shaped elongated grooves 210 is respectively the formation of an incline 211 gradually ascending toward the direction of rotation of the brake, so the cone-shaped roller post 24 can create an ascending effect rolling along the incline 211. On the end side of the push block 23 opposite the turning block 21 is the formation of several matching cone-shaped elongated grooves 230, each cone-shaped elongated groove 230 corresponding to each cone-shaped elongated groove 210, and, the interval between two cone-shaped elongated grooves is designed to properly cover the radius of each cone-shaped roller post 24 (shown in FIG. 5);

The tuning block 21 is installed inside the outer casing 20. The swing member 22 is linked to the tuning block 21 on the outside of the outer casing 20. Meanwhile, the push block 23, the moving member 25, the flexible member 26 and the outer cover 27 are arranged in sequence on the other side of the turning block 21. The cone-shaped roller post 24 is accommodated between the cone-shaped elongated grooves 210 and the cone-shaped elongated grooves 230 of the tuning block 21 and the push block 23, thereby composing a push structure of brake mechanism with labor-saving and enhanced brake performance, as shown in FIG. 5 which illustrate the interior configuration of the invention.

Figure 6:
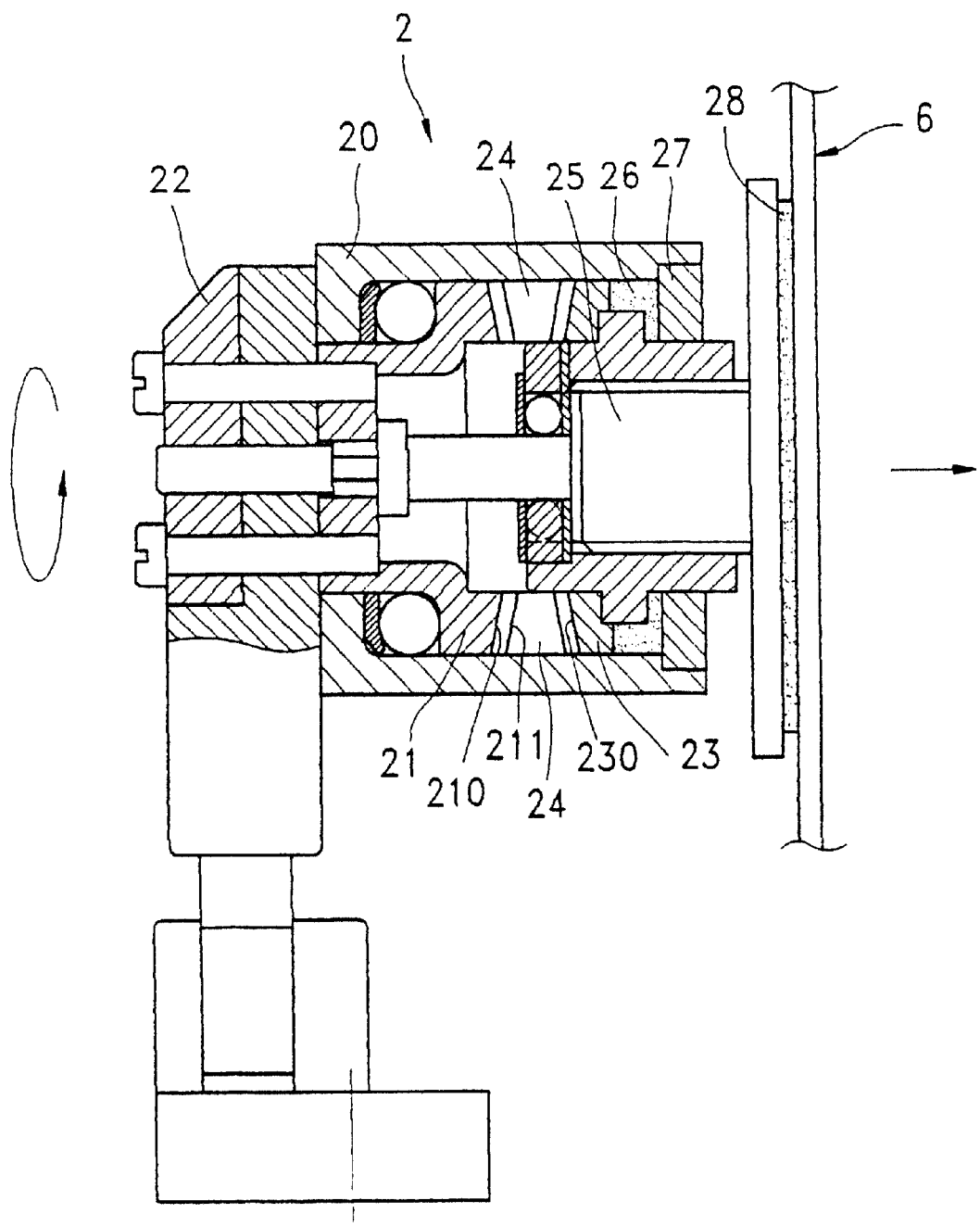
FIG. 6 is a schematic view of the invention in operation, showing the relative positions of the turning block and the push block operating in this invention.

As shown in FIGS. 5 and 6, when the user pulls the brake handle to operate the swing member 22 of the brake mechanism 2, the swing member 22 will rotate the turning block 21 synchronously in the brake direction, so the cone-shaped roller post 24 inside the cone-shaped elongated grooves 210 will roll along the incline 211, creating an ascending effect (as shown in FIG. 6), then the cone-shaped roller post 24 will push the push block 23 to move, and the moving member 25 of the brake block 28 will compress the flexible member 26 to move, and the brake block 28 will touch the brake disc 6 to achieve its brake function;

Conversely, when the user releases the brake handle, the brake wire will be subjected to the resiliency of the spring and synchronously drive the swing member 22 to reset to its original position (being a known mechanical function, it requires no elaboration here), thereby the turning block 21 will rotate in reverse direction, and the cone-shaped roller post 24 will roll back to its original position. Meanwhile, the push block 23 and the moving member 25 will also be subjected to the resilient force of the flexible member 26 and achieve the purpose of releasing the brake disc 6.

It is known from the above description that, the invention involves matching cone-shaped elongated grooves that are formed on the opposite sides of the turning block and the push block, with cone-shaped roller post accommodated between them, and on the bottom of the cone-shaped elongated groove is the formation of an incline gradually ascending toward the direction of brake rotation, so that the turning block will smoothly push the push block when it is rotated to achieve brake performance, meanwhile, this invention has the following advantages and applicable values:

1. Enhanced Brake Thrust

Since the length of the cone-shaped roller post runs across the end surface of the entire push block, and the cone-shaped roller post and the cone-shaped elongated grooves are in linear contact, so, compared with the prior art of roller having only a diameter at the most, it is obvious that the invention's thrust line is longer, which contributes to enhance the brake thrust and brake efficiency.

2. Reduced Friction Coefficient

Figure 2:
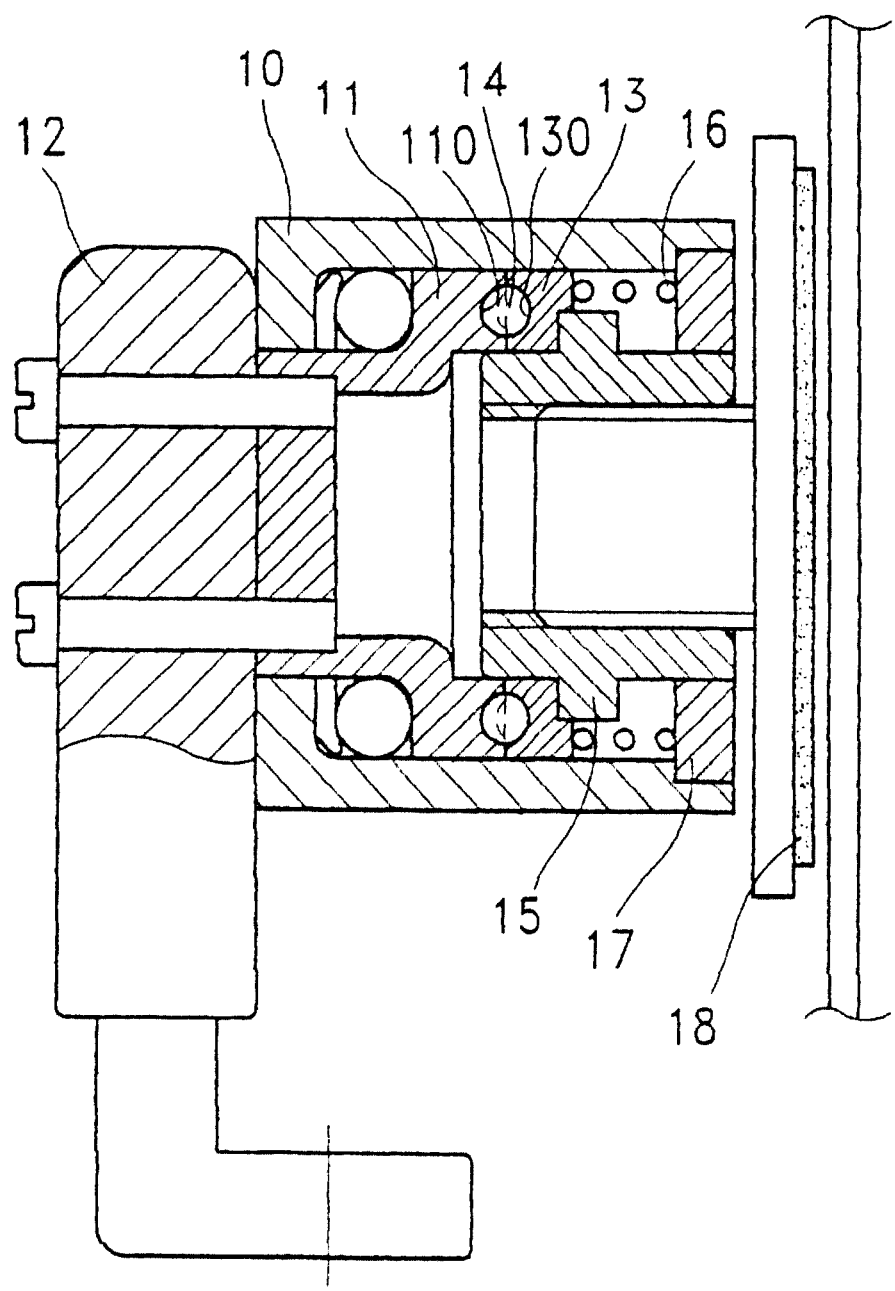
FIG. 2 is a schematic view of the prior art of brake mechanism.
Figure 3:
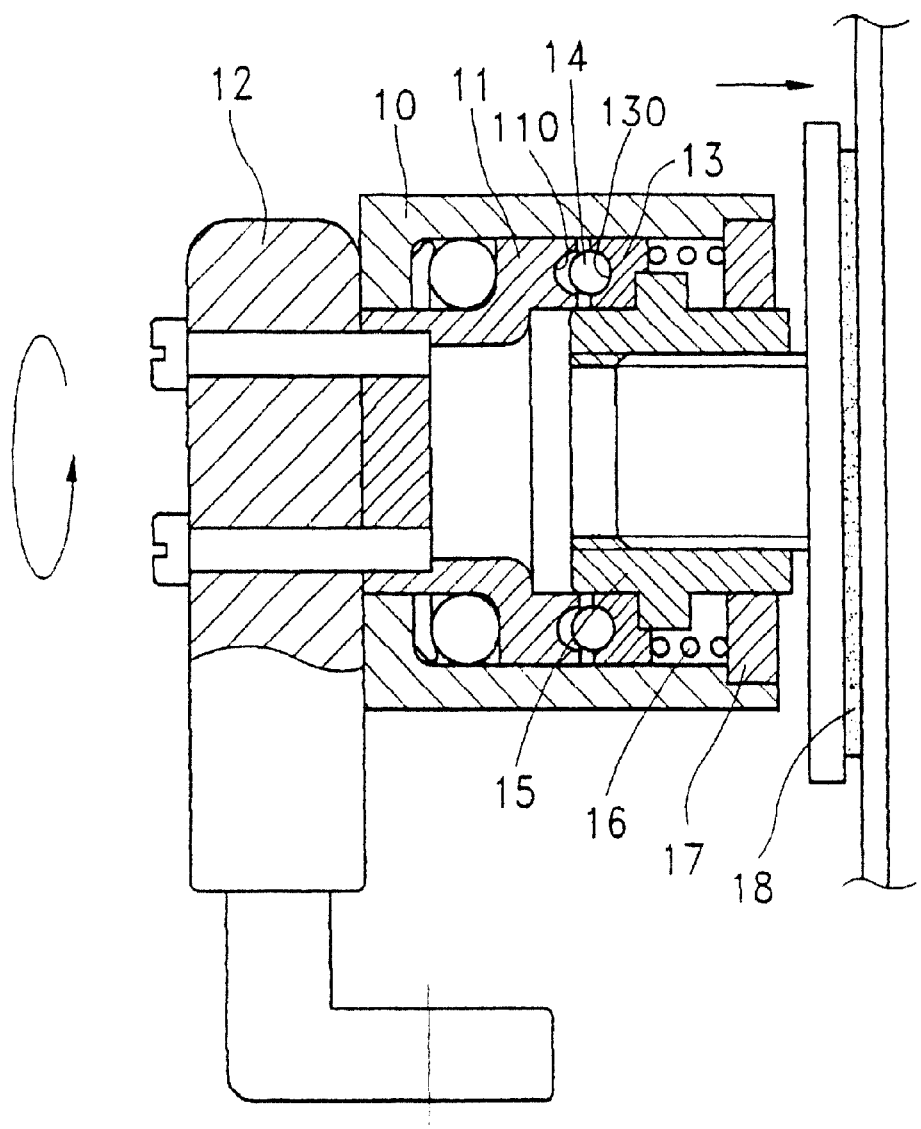
FIG. 3 is a schematic view of the prior art of brake mechanism in operation.

The conventional roller is entirely enveloped within the semi-circle of the turning block and the push block (as shown in FIG. 2), therefore the contact area of the entire sphere is increased, so there is extremely big friction at the starting point where the roller is pushed. In this invention, however, the cone-shaped roller post is in linear contact with the cone-shaped elongated groove, so the friction coefficient is small enough to enable easy movement and laborsaving operation, thereby avoiding the problem of forceful pulling of the brake handle in the prior art, reducing the occurrence of broken brake wire, and upgrading safety in brake performance.

3. More Stabilized Brake Thrust

As described above, due to more powerful brake thrust, smaller friction coefficient and laborsaving operation, this invention has the advantages of stable brake thrust and smooth brake performance.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A push structure of a brake mechanism, said brake mechanism involving a turning block installed in an outer casing, on the outside of the outer casing being a swing member to drive the turning block, on the other side of the turning block inside the outer casing being a push block, said push block driven by the turning block for parallel movement, and on the other side of the push block being arranged in sequential order a moving member and a flexible member, said outer casing involving an outer cover to restrict the above components inside, a brake block being protruded out of the outer casing and tightened onto the moving member, to perform braking operation on a brake disc; wherein on the end surface of the turning block and opposite the push block is the formation of several cone-shaped elongated grooves, on the bottom of each cone-shaped elongated groove is the formation of an incline gradually ascending toward the direction of rotation of the brake, and on the end surface of the push block is the formation of matching cone-shaped elongated grooves, between respectively corresponding cone-shaped elongated grooves being accommodated a cone-shaped roller post, the cone-shaped roller post rolling along the incline of the cone-shaped elongated grove, producing an ascending effect, thereby comprising a thrust structure of brake mechanism, between the cone-shaped elongated grooves is a radius to accommodate the cone-shaped roller post.

2. The thrust structure of brake mechanism as claimed in claim 1, wherein the flexible member is a rubber block to extend service life.

\* \* \* \* \*